Oct. 27, 1964   R. L. ALLEN   3,153,946
CONTROL DEVICE
Filed Dec. 19, 1957   2 Sheets-Sheet 1
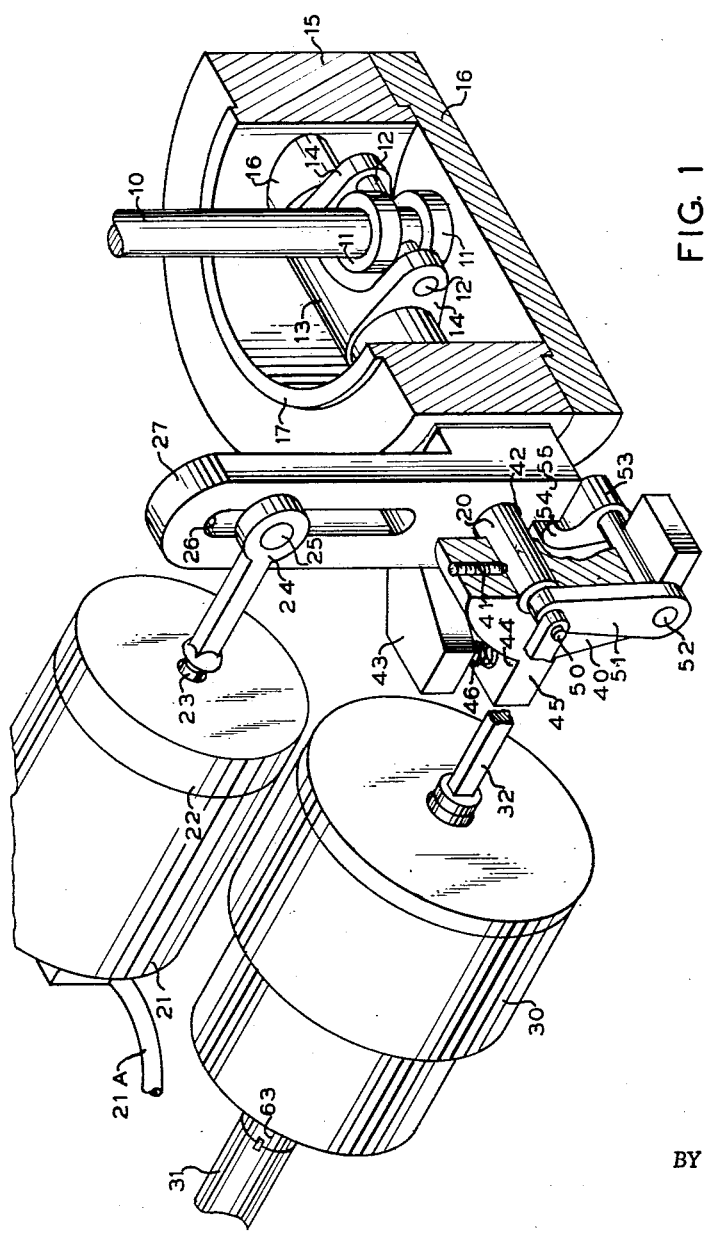
FIG. 1
INVENTOR.
ROBERT L. ALLEN
BY 
ATTORNEY Oct. 27, 1964 R. L. ALLEN 3,153,946
CONTROL DEVICE
Filed Dec. 19, 1957 2 Sheets-Sheet 2
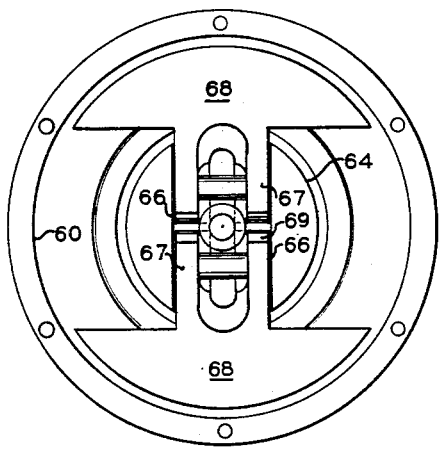
FIG. 2
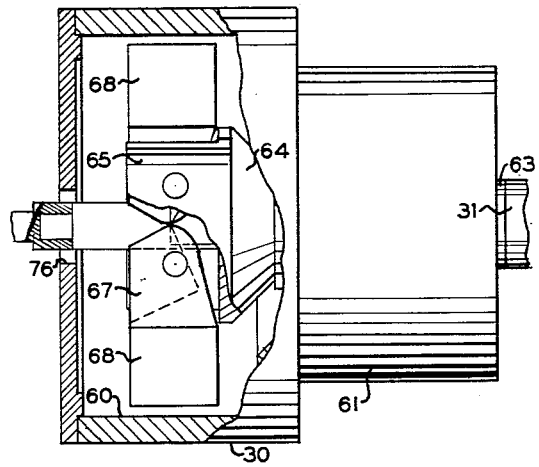
FIG. 3
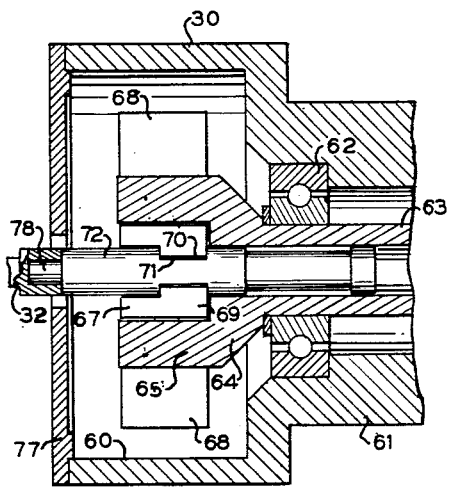
FIG. 4
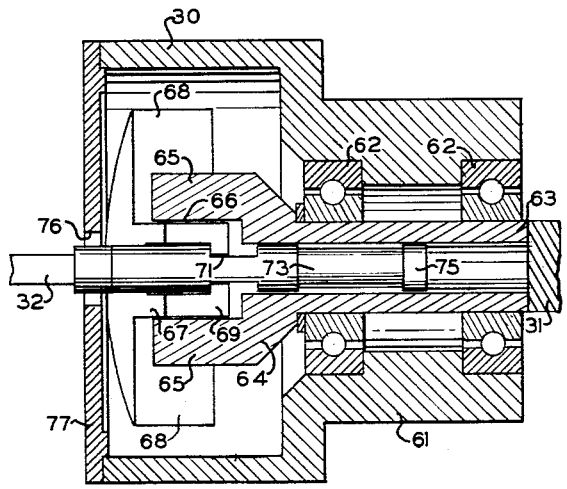
FIG. 5
INVENTOR.
ROBERT L. ALLEN
BY 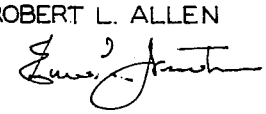
ATTORNEY

United States Patent Office 3,153,946
Patented Oct. 27, 1964

3,153,946
CONTROL DEVICE
Robert L. Allen, Atlanta, Ga., assignor to Georgia Tech Research Institute, Atlanta, Ga., a corporation of Georgia
Filed Dec. 19, 1957, Ser. No. 703,896
12 Claims. (Cl. 74—479)

This invention relates to a speed responsive control modulating device, and is particularly concerned with the application of centrifugal forces variable in response to rotational speed for the modulation of control responses primarily dictated by other mechanism.

While certain aspects of the present inventive concept are broadly applicable for the modulation of control mechanisms of a wide variety of types and application, the invention is here set forth as a speed responsive means for modulating the activity of a pressure responsive mechanism. As an illustration of one practical application of the invention, the structure here presented is applicable in the control of a variable speed rotary pump of the type disclosed in my copending application, Serial No. 703,898, filed on even date herewith, and now abandoned, which application is incorporated herein by reference and to which attention may be directed for details of construction and operation of the pump. Suffice it, therefore, for present consideration to state that the pump of my copending application includes a rotary shaft provided with a variably eccentric driving head, the variation of eccentricity of which determines the relative volumetric output with respect to pump rotation. Such variable eccentricity is controlled by the reciprocal adjustment of a control rod. One preferred application of the pump is in the supply of fuel to an internal combustion engine under the influence of the intake manifold pressure.

While control of the volumetric output of the pump, in direct response to intake manifold pressure, may well be effective and efficient over wide ranges of engine operating conditions, it has been found desirable in some instances to provide a supervening supplemental control operable under the dictates of engine speed. Thus, for instance, at extreme low engine speeds, although the rotation of the pump is commensurate with the engine speed, it may be desirable to further increase or diminish the fuel supply because of change in volumetric efficiency of the engine. In that case, the present speed responsive mechanism will supervene over the activity of the pressure responsive means to further adjust the fuel supply. However, under ordinary operating conditions, the engine speed coupled with the intake manifold responsive mechanism sufficiently controls the pump, and hence the overriding control is not required. The present invention, therefore, provides for the speed responsive supervening control as intake manifold pressures increase in accordance with normal operating conditions of the engine. It will of course be understood, however, that the invention is in no way so limited to such application.

It is therefore among the objects of the present invention to provide a novel and improved speed responsive actuating mechanism particularly designed for use in cooperation with associated control means for modifying the controlling responsiveness of such associated means.

It is also an object of the present invention to provide novel and improved interconnecting means between a plurality of control devices whereby the ultimate control movement responsive thereto is a resultant of the component control movements applied.

A further object of the present invention is to provide a control mechanism including independently operable control elements with interconnected linkage mechanism whereby the control actuation of one of such means may be modified and adjusted by the operation of the associated control means.

The invention also includes as an objective that of providing selectively operable intervening modulating means for modifying a controlling response only under limited operating circumstances, thus providing a wide range for operation under the normal control of a single instrumentality.

More specifically, it is an object of the present invention to provide a control mechanism particularly adapted for the control of fuel for an internal combustion engine through the intake manifold pressure with associated means for overriding the pressure responsive control in a manner to superpose a modulating effect in response to engine speed.

Another object of the present invention is to provide a novel and improved fly ball type centrifugal speed responsive control device.

Numerous other objects, features and advantages of the present invention will be apparent from consideration of the following specification taken in conjunction with the accompanying drawing, in which:

FIG. 1 is an isometric view of a control assembly in accordance with the present invention.

FIG. 2 is an end elevation of the speed responsive portion of the assembly with the end cover removed.

FIG. 3 is a side elevation of the speed responsive mechanism with portions of the housing thereof broken away.

FIG. 4 is a vertical cross sectional view showing the governor in position of high speed rotation.

FIG. 5 is a view similar to FIG. 4 showing the governor at rest.

In that form of the present invention here shown by way of illustration, a vertical control rod 10 is shown as being axialy movable by the provision of spaced actuating collars 11 which receive therebetween pins 12 of a furcated actuator 13, the furcations 14 of which support the pins 12 in their location between the collars 11. It will of course be understood that, as the actuator 13 is rocked, the pins will engage the collars to reciprocate the rod 10. The control rod and its actuator assembly are mounted within a cylindrical housing 15 formed with internally extending opposed bosses 16 adapted to provide bearings for the shaft upon which the actuator 13 is mounted. This construction is such as to conform with the construction of the variable displacement rotary pump of my copending application, herein before referred to, which is adapted to be controlled as to its volumetric output by the reciprocations of an actuating rod of the type shown at 10 in the present construction. The present housing 15 is shown as closed at the bottom by a closure disc 16 and provided with an inward marginal shoulder 17 to accommodate a pump of the type above referred to. The actuator 13 of the present invention is mounted on and keyed for movement with a control shaft 20 which may have bearings within the bosses 16 and which extends from the actuator 13 through the housing to the left, as shown in FIG. 1, protruding therefrom as indicated. It will of course be understood that the present inventive concept may be carried out with various types of mountings, housings or associated combining mechanisms.

One of the control mechanisms of the present assembly is generally indicated as a cylinder 21 through the end plate 22 of which there extends a control rod 23 formed with a head 24 adapted to carry pin 25 slideable within a longitudinal slot 26 in an actuating lever 27. While the invention is not so limited, it is contemplated that the cylinder 21 may form the housing of an expansible chamber type of pressure responsive control mechanism. To which control pressure such as engine intake manifold pressure may be supplied as by the tube 21A. One form of such mechanism may be that as disclosed in my copending application entitled "Fluid Pressure Responsive Control Mechanism," Serial No. 703,897, filed on even date herewith, now Patent No. 3,073,348, to which references may be had for illustration of one type of pressure responsive control mechanism which may actuate the rod 23 and its associated head 24 and pin 25.

The second control mechanism of the present assembly is generally indicated by the numeral 30 and is preferably in the form of a fly ball type speed responsive unit as illustrated in detail in FIGS. 2, 3, 4, and 5. In FIG. 1, the drive for the governor is indicated as a shaft 31 and speed responsive movement is imparted therefrom to the actuator rod 32. Movement of the shaft 20 in joint response to the rods 23 and 32 is provided by an actuator 40 secured to the shaft 20, as by set screw 41, whereby oscillations of the actuator will be imparted to the shaft. The actuator lever 27 is loosely mounted on shaft 20 through aperture 42 permitting free relative pivotal movement of the lever upon the shaft. From the side of the lever 27 there is extended a wing 43, the lower face of which is positioned in cooperating parallel relation to the upper face 44 of a laterally extending companion wing 45 of the actuator 40. Between the wings 43 and 45, a spring 46 is provided whereby actuator 40 may move with respect to lever 27, but by which a yieldable interconnection is provided. Thus, when the rod 23 is withdrawn within the cylinder 21 to rock the lever 27 in a counterclockwise direction, the wing 43 will move downwardly toward the wing 45, thus compressing the spring 46 and tending to rock the actuator 40 in a similar counterclockwise direction. The rod 32 of the speed responsive unit 30 is connected by a pin 50 to a link 51 pivoted with respect to the actuator 40 through another bar 52 extending through the actuator at a point remote from its axis of rotation with shaft 20. The inner opposite end of bar 52 is provided with a catch element 53, the terminal dog 54 of which is adapted to contact an abutment shoulder 55 formed on the inner face of the lower end of the lever 27.

In the operation of this linkage mechanism, it will be seen that as the rod 23 moves inwardly of the cylinder 21, in the left hand direction as indicated in FIG. 1, the link 27 will be rocked in counterclockwise direction. When this apparatus is applied as a control mechanism for a fluid fuel pump for internal combustion engines, this movement corresponds to a demand for more fuel by the engine, as when the throttle is opened and the intake manifold pressure increases. Since the link 27 is freely rotatable on the shaft 20, such counterclockwise movement of the link will not positively move the shaft; however, such counterclockwise movement will depress the wing 43 which acts through the spring 46 tending to impart a responsive downward movement of the wing 44 in a direction to rock the actuator 40 in counterclockwise direction. Since the actuator 40 is directly connected with the shaft 20, such tendency toward counterclockwise motion of the actuator 40 through counterclockwise movement of the link 27 will tend to impart counterclockwise rotation of the shaft 20 in a direction to lift the rod 10, such movement corresponding to an increase in fuel output by the pump.

If under these circumstances the rod 32 of the speed responsive device 30 is assumed to be in a stationary position, the rocker bar 52 will move bodily with the actuator 40 but without rotation on its own axis. Thus, in such assumed situation, the catch end 54 will follow the shoulder 55 as link 27 is rotated in counterclockwise direction, and the actuator 40 will rotate in a like direction through the interposition of the spring 46 to increase pump output. Throughout such movement the spring 46 will maintain the contact of the latch 54 against the surface 55; however, rod 32 being stationary no motivating force will be applied through the latch.

If a contrary situation is assumed with the lever 27 stationary but with the rod 32 moving toward the left, as in a decrease of speed, the rocker bar 52 will be moved with the counterclockwise pivotal movement of the arm 51. A like movement of the arm 53 will tend to move the catch end 54 away from the surface 55 permitting spring 46 to urge actuator 40 in counterclockwise direction to lift rod 10 and increase fuel output by the pump. Conversely, movement to the right of either rod 23 or 32 will tend to lower rod 10 and reduce volumetric output of the pump.

It will of course be understood that the motions here referred to are illustrative rather than representing actual movements, since movements of the rods 23 and 32 may be simultaneous to provide cumulative effect on the reacting faces. An important feature to note is that when the engine has attained appropriate speed the rod 32 is in its farthest right hand position and thereafter remains stationary to permit shaft 20 to be responsive solely to the rod 23. In normal operation ranges of speed, the governor rod 32 will be in fully extended position; hence the actuation of the rod 10 will be under the direct influence of the manifold pressure applied through the cylinder 21. In starting the engine and while the speeds are low, as for instance below 2000 r.p.m., an increase of fuel being that dictated by the high manifold pressure representing an open throttle may be desired. Under these circumstances the rod 32 is moved by the speed responsive mechanism to the left in FIG. 1, thus rocking the shaft 52 in counterclockwise direction, hence relieving the pressure applied by the latch 54 against the surface 55 and permitting the spring 56 to move the actuator 40 in counterclockwise direction by forces acting independently of the link 27. However, it will be understood that in such starting of the motor, high manifold pressure will at the same time induce a movement of the link 23 to the right, causing a counterclockwise motion of the link 27 and a compressing force by the wing 43 against the spring 46. Since during this same function the rod 32 is moved to the left, under low engine speeds, the link 52 will at the same time tend to rock in counterclockwise direction to relieve pressure by the catch 54 on the surface 55 thus permitting the full force of the spring 46 to act on the wing 44 to further the counterclockwise rotation of the shaft 20, thus moving the rod 10 upwardly to increase the volume of fuel flow. After the engine has attained the desired speed of rotation, the rod 32 will be moved outwardly to the right to rock the shaft 52 in clockwise direction, whereby the latch 54 will bear against the surface 55 to counteract the pressure exerted by the spring 46 and thus to reestablish a condition in which the control of the movements of the volume control rod 10 of the pump will be in direct response to the intake manifold pressure during speed ranges exceeding that for which the governor has been set.

Referring more particularly to FIGS. 2, 3, 4 and 5, depicting the structure of the speed responsive governor within the casing 30 of FIG. 1, it will be seen that the casing 30 defines an enlarged chamber 60 at one end thereof and is provided with a reduced neck portion 61 providing for the mounting of internal bearings 62 which are adapted to rotatably support a tubular drive shaft 63 to which the shaft 31 may be connected for delivering rotation at engine speed to the governor. The inner end of the tubular shaft 63 is formed with an enlarged head 64 defining inwardly flat faced opposed segments 65, the inner flat faces 66 of which define transverse openings in which are seated the inner furcated arms 67 of the centrifugal governor weights 68 as more clearly indicated in FIG. 2 the furcated arms terminate as at 69 short of the center of the chamber 60 and are formed with inwardly protruding terminal lugs 70 received within cooperating opposed recesses 71 of the governor actuating rod 72.

The shank 73 of the rod 72 is slideably fitted within the central hollow bore of the shaft 63 and guided therein for reciprocation by a terminal headed end 75, while the outer end extends through an aperture 76 of an end plate 77 of the housing 30. The protruding end 78 of the rod 72 is adapted for engagement with the extension rod 32 and thus movement of the rod 72 is imparted to the rod 32.

From this structure it will be seen that with the governor at rest, as shown in FIGS. 3 and 5, the pressure of the spring 70 or its equivalent will tend to move the rod 72 outwardly of the casing 30 with the weight 68 pivoted outwardly from the plane normal to the axis of rotation of the shaft 63. As the engine speed increases to normal operating speed, the governor weight through centrifugal force will move outwardly to lie in a plane normal to the axis of rotation of the shaft 63 to assume the position indicated in FIGS. 3 and 4. Such movement will draw the rod 62 inwardly within the casing 60 to protrude the shaft from the casing at high speed, thus moving the rod 32 toward the right as in FIG. 1 and against the pressure of the spring 70 so as to withdraw the governor influence on movement of the shaft 20 and hence the rod 10. Thus, after the engine has acquired the desired speed, the volumetric flow of the pump under control of the rod 10 will be in direct response to the manifold pressures as applied through the chamber 21.

It will of course be understood that in a consideration of the foregoing specification the structural details are presented by way of exemplification, and that in the practice of the invention numerous changes, modifications and the full use of equivalents may be resorted to for achieving a supervening control force actuated in response to rotary speed for modifying, under certain speed conditions, the control of mechanism by fluid pressures. Such changes, modifications and the full use of equivalents are deemed to be within the scope of the invention as defined by the appended claims.

I claim:

1. Control mechanism including a pressure responsive control rod, a lever pivotally movable by said pressure responsive rod, a control actuation shaft, yieldable means operatively connected to said shaft and said lever for moving said shaft in response to movements of said lever, means operatively connected to said yieldable means for altering the force of said yieldable means to effect the responsive movement of said shaft with respect to said lever, and a connection operatively connected to said shaft and said pressure responsive control rod for moving said shaft independently by said pressure responsive control rod.

2. The combination, with a control shaft, a pressure responsive means operatively connected to said shaft for moving the same and a resiliently yieldable connection operatively connected to said means and said shaft between said means and said shaft, of speed responsive means operatively connected to said shaft for moving said shaft independently of said pressure responsive means.

3. The combination, with a control shaft, a pressure responsive means operatively connected to said shaft for moving the same and a resiliently yieldable connection operatively connected to said means and said shaft between said means and said shaft, of speed responsive means operatively connected to said shaft for moving said shaft independently of said pressure responsive means, and means operatively connected to said shaft and said pressure responsive means for actuating said shaft by said pressure responsive means independently of said speed responsive means.

4. The combination, with a control shaft, a pressure responsive means operatively connected to said shaft for moving the same and resiliently yieldable connection operatively connected to said means and said shaft between said means and said shaft, of speed responsive means for moving said shaft independently of said pressure responsive means, means operatively connected to said shaft and said speed responsive means for actuating said shaft by said speed responsive means independently of said pressure responsive means, and means operatively connected to said shaft for operating said shaft jointly by said speed responsive means and said pressure responsive means.

5. In a control mechanism, a pressure responsive device, a lever operatively connected to said pressure responsive device and operable by said pressure responsive device, an actuator, resilient means operatively connected to said lever and said actuator between said lever and said actuator for moving said actuator by said lever, a speed responsive device, an arm operatively connected to said speed responsive device and on said actuator pivotally movable with respect thereto in response to predetermined responses of said speed responsive device, and means operatively connected to said resilient means and said arm for altering the force of said resilient means in response to movements of said arm.

6. In a control mechanism, a pressure responsive device, a lever operatively connected to said pressure responsive device and operable by said pressure responsive device, an actuator, resilient means operatively connected to said lever and said actuator between said lever and said actuator for moving said actuator by said lever, a speed responsive device, an arm operatively connected to said speed responsive device and on said actuator pivotally movable with respect thereto in response to predetermined responses of said speed responsive device, and a connection operatively connected to said arm and said lever between said arm and said lever.

7. In a control mechanism, a pressure responsive device, a lever operatively connected to said pressure responsive device and operable by said pressure responsive device, a wing operatively connected to said lever and on said lever, an actuator, a wing operatively connected to said actuator and in said actuator, resilient means operatively connected to said wings and between said wings for moving said actuator by said lever, a speed responsive device, an arm operatively connected to said speed responsive device and on said actuator pivotally movable with respect thereto in response to predetermined responses of said speed responsive device, a connection operatively connected to said arm and said lever between said arm and said lever, and means operatively connected to said resilient means and said arm for altering the force of said resilient means in response to movements of said arm.

8. In a control mechanism, a pressure responsive device, a lever operatively connected to said pressure responsive device and operable by said pressure responsive device, a wing operatively connected to said lever and on said lever, an actuator, a wing operatively connected to said actuator and in said actuator, resilient means operatively connected to said wings and between said wings for moving said actuator by said lever, a speed responsive device, an arm operatively connected to said speed responsive device and on said actuator pivotally movable with respect thereto in response to predetermined responses of said speed responsive device, and a connection operatively connected to said arm and said lever between said arm and said lever, said connection including a latch on said arm and a shoulder on said lever.

9. In a control mechanism, a pressure responsive device, a lever operatively connected to said pressure responsive device and operable by said pressure responsive device, a wing operatively connected to said lever and on said lever, an actuator, a wing operatively connected to said actuator and in said actuator, resilient means operatively connected to said wings and between said wings for moving said actuator by said lever, a speed responsive device, an arm operatively connected to said speed responsive device and on said actuator pivotally movable with respect thereto in response to predetermined responses of said speed responsive device, and a connection operatively connected to said arm and said lever between said arm and said lever, said connection including a latch on said arm and a shoulder on said lever, said lever being pivotally mounted on an axis of rotation coincident with the axis of rotation of said actuator.

10. In a control mechanism a first control rod, means supporting said control rod for movement axially, a control shaft rotatably carried by said means and disposed normal to and adjacent said control rod, means connecting said control shaft and said control rod for translating rotational movement of said control shaft into axial movement of said control rod, a radially extending actuating lever freely rotatably carried by said control shaft, a pressure responsive means movable in response to variation in pressure, a second control rod movable by said pressure responsive means, said second control rod being connected to said lever for moving said lever when said second control rod is moved by said pressure responsive means, a wing extending radially from said lever adjacent said control shaft, an actuator fixed on said shaft, a companion wing extending radially from said actuator adjacent said wing of said lever, spring means disposed between said wing of said lever and said companion wing, a rotatable bar pivotally carried by said actuator in spaced parallel relationship to said control shaft, a catch element extending radially from the inner end of said rotatable bar and engaging said lever for varying the radial position of said lever with respect to said actuator upon rotation of said rotatable bar, and means operatively connected to said bar for rotating said bar.

11. In a control mechanism a first control rod, means supporting said control rod for movement axially, a control shaft connected to said control rod for moving said control rod axially upon rotation of said control shaft, an actuating lever rotatably carried by said control shaft, a pressure responsive means movable in response to variation in pressure, a second control rod movable by said pressure responsive means for moving said lever when said second control rod is moved by said pressure responsive means, a first wing extending from said lever, an actuator fixed on said shaft adjacent said lever, a second wing extending radially from said actuator adjacent said first wing, spring means disposed between said first wing and said second wing, a catch element carried by said actuator and engaging said lever for varying the radial position of said lever with respect to said actuator upon movement of said catch element, and speed responsive means operatively connected to said catch element for moving said catch element.

12. In a control mechanism, a first control rod, a housing for supporting said control rod for movement axially, a control shaft rotatably carried by said housing and disposed normal to and adjacent said control rod, a first actuator connecting said control rod and said control shaft whereby rotation of said control shaft is translated into axial movement of said control rod, said control shaft protruding outwardly of said housing, a radially extending actuating lever freely rotatably carried by the outwardly protruding portion of said control shaft, said lever being provided with a longitudinally extending slot therein, a pressure responsive means movable in response to variation in pressure, a second control rod movable by said pressure responsive means, a first pin carried by said second control rod, said pin protruding into said slot for moving said lever when said second control rod is moved by said pressure responsive means, a first wing extending radially from said lever adjacent said control shaft, a second actuator fixed on said control shaft outwardly of said lever, a second wing extending radially from said second actuator adjacent said first wing, spring means disposed between said first wing and said second wing, a rotatable bar pivotally carried by said actuator in spaced parallel relationship to said control shaft, a catch element extending radially from the inner end of said rotatable bar and engaging said lever for varying the radial position of said lever with respect to said second actuator upon rotation of said rotatable bar, a link fixed to the end of said rotatable bar outwardly of said second actuator, a pin carried by said link in essentially concentric relationship to said control shaft, a rod connected to said second pin, and speed responsive means for moving said last mentioned rod.

References Cited in the file of this patent

UNITED STATES PATENTS

| | | |
|---|---|---|
| 1,407,041 | Peterson | Feb. 21, 1922 |
| 2,272,726 | Sanders | Feb. 10, 1942 |
| 2,569,664 | Gewinner | Oct. 2, 1951 |
| 2,580,369 | Stevens | Dec. 25, 1951 |
| 2,690,167 | Moulton | Sept. 28, 1954 |
| 2,705,047 | Williams et al. | Mar. 29, 1955 |
| 2,813,400 | Baker | Nov. 19, 1957 |
| 2,873,728 | Biermann | Feb. 17, 1959 |